United States Patent
Dailey (10) Patent No.: US 11,263,136 B2
(45) Date of Patent: Mar. 1, 2022

(54) FAULT TOLERANT SYSTEMS AND METHODS FOR CACHE FLUSH COORDINATION

(71) Applicant: Stratus Technologies Bermuda, Ltd., Hamilton (BM)

(72) Inventor: Nathaniel Horwitch Dailey, Stow, MA (US)

(73) Assignee: STRATUS TECHNOLOGIES IRELAND LTD.

( * ) Notice: Subject to any disclaimer, the term of this patent is extended or adjusted under 35 U.S.C. 154(b) by 0 days.

(21) Appl. No.: 16/900,915

(22) Filed: Jun. 13, 2020

(65) Prior Publication Data

US 2021/0034523 A1 Feb. 4, 2021

Related U.S. Application Data

(60) Provisional application No. 62/882,380, filed on Aug. 2, 2019.

(51) Int. Cl.
*G06F 12/08* (2016.01)
*G06F 12/0815* (2016.01)
*G06F 12/0804* (2016.01)

(52) U.S. Cl.
CPC ...... *G06F 12/0815* (2013.01); *G06F 12/0804* (2013.01); *G06F 2212/1032* (2013.01)

(58) Field of Classification Search
CPC ............. G06F 12/0804; G06F 12/0815; G06F 2212/1032
USPC ......................................................... 711/119
See application file for complete search history.

(56) References Cited

U.S. PATENT DOCUMENTS

| | | | |
|---|---|---|---|
| 6,355,991 B1 | 3/2002 | Goff et al. | |
| 6,453,343 B1 * | 9/2002 | Housel, III | H04L 29/06 709/213 |
| 6,633,996 B1 | 10/2003 | Suffin et al. | |
| 6,687,851 B1 | 2/2004 | Somers et al. | |
| 6,691,225 B1 | 2/2004 | Suffin | |
| 6,691,257 B1 | 2/2004 | Suffin | |
| 6,708,283 B1 | 3/2004 | Nevin et al. | |

(Continued)

OTHER PUBLICATIONS

Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.

(Continued)

*Primary Examiner* — Than Nguyen
(74) *Attorney, Agent, or Firm* — K&L Gates LLP (57) ABSTRACT

In part, the disclosure relates to a method of performing a checkpoint process in an active-active computer system including a first node and a second node, wherein each node includes an active checkpoint cache, flush cache, and data storage. In various embodiments, flush operations are coordinated between nodes. The method includes receiving a request for a checkpoint operation at the first node; pausing activity at the first node; notifying the second node of the impending checkpoint operation; performing the checkpoint operation, wherein data associated with the checkpoint operation includes the active checkpoint cache and the flush cache; merging the active checkpoint cache into the flush cache; and resuming activity at the first node. The method may also include each node informing the other node of the completion of cache flush operations.

8 Claims, 11 Drawing Sheets

(56) References Cited

U.S. PATENT DOCUMENTS

| | | | |
|---|---|---|---|
| 6,718,474 B1 | 4/2004 | Somers et al. |
| 6,766,413 B2 | 7/2004 | Newman |
| 6,766,479 B2 | 7/2004 | Edwards |
| 6,802,022 B1 | 10/2004 | Olson |
| 6,813,721 B1 | 11/2004 | Tetreault et al. |
| 6,842,823 B1 | 1/2005 | Olson |
| 6,862,689 B2 | 3/2005 | Bergsten et al. |
| 6,874,102 B2 | 3/2005 | Doody et al. |
| 6,886,171 B2 | 4/2005 | MacLeod |
| 6,928,583 B2 | 8/2005 | Griffin et al. |
| 6,970,892 B2 | 11/2005 | Green et al. |
| 6,971,043 B2 | 11/2005 | McLoughlin et al. |
| 6,996,750 B2 | 2/2006 | Tetreault |
| 7,065,672 B2 | 6/2006 | Long |
| 7,496,786 B2 | 2/2009 | Graham et al. |
| 7,496,787 B2 | 2/2009 | Edwards et al. |
| 7,669,073 B2 | 2/2010 | Graham et al. |
| 7,904,906 B2 | 3/2011 | Puthukattukaran et al. |
| 7,958,076 B2 | 6/2011 | Bergsten et al. |
| 8,117,495 B2 | 2/2012 | Graham |
| 8,161,311 B2 | 4/2012 | Wiebe |
| 8,234,521 B2 | 7/2012 | Graham et al. |
| 8,271,416 B2 | 9/2012 | Al-Biek et al. |
| 8,312,318 B2 | 11/2012 | Graham et al. |
| 8,381,012 B2 | 2/2013 | Wiebe |
| 8,812,907 B1 | 8/2014 | Bissett et al. |
| 9,251,002 B2 | 2/2016 | Manchek et al. |
| 9,588,844 B2 | 3/2017 | Bissett et al. |
| 9,652,338 B2 | 5/2017 | Bissett et al. |
| 9,760,442 B2 | 9/2017 | Bissett et al. |
| 10,216,598 B2 | 2/2019 | Haid et al. |
| 10,360,117 B2 | 7/2019 | Haid et al. |
| 2001/0042202 A1 | 11/2001 | Horrath et al. |
| 2002/0016935 A1 | 2/2002 | Bergsten et al. |
| 2002/0070717 A1 | 6/2002 | Pellegrino |
| 2003/0046670 A1 | 3/2003 | Marlow |
| 2003/0095366 A1 | 5/2003 | Pellegrino |
| 2006/0222125 A1 | 10/2006 | Edwards et al. |
| 2006/0222126 A1 | 10/2006 | Edwards et al. |
| 2006/0259815 A1 | 11/2006 | Graham et al. |
| 2006/0274508 A1 | 12/2006 | LaRiviere et al. |
| 2007/0011499 A1 | 1/2007 | Begsten et al. |
| 2007/0028144 A1 | 2/2007 | Graham et al. |
| 2007/0038891 A1 | 2/2007 | Graham |
| 2007/0106873 A1 | 5/2007 | Lally et al. |
| 2007/0174484 A1 | 7/2007 | Lussier et al. |
| 2009/0249129 A1 | 10/2009 | Femia |
| 2015/0205688 A1 | 7/2015 | Haid et al. |
| 2015/0263983 A1 | 9/2015 | Brennan et al. |
| 2017/0270041 A1* | 9/2017 | Talagala ............ G06F 12/08 |
| 2017/0324609 A1 | 11/2017 | Hong et al. |
| 2018/0046480 A1 | 2/2018 | Dong et al. |
| 2018/0143885 A1 | 5/2018 | Dong et al. |
| 2020/0042343 A1* | 2/2020 | Wang ............ G06F 9/45558 |
| 2020/0050523 A1 | 2/2020 | Pawlowski et al. |
| 2021/0034447 A1 | 2/2021 | Horvath et al. |
| 2021/0034464 A1 | 2/2021 | Dailey et al. |
| 2021/0034465 A1 | 2/2021 | Haid et al. |
| 2021/0034483 A1 | 2/2021 | Haid |
| 2021/0034523 A1 | 2/2021 | Dailey |
| 2021/0037092 A1 | 2/2021 | Cao |

OTHER PUBLICATIONS

Dong et al., "COLO: COarse-grain LOck-stepping Virtual Machine for Non-stop Service", https://www.linux-kvm.org/mages/1/1d/Kvm-forum-2013-COLO.pdf; 24 pages.

\* cited by examiner

FAULT TOLERANT SYSTEMS AND METHODS FOR CACHE FLUSH COORDINATION

RELATED APPLICATIONS

This application claims the benefit of priority to U.S. Provisional Patent Application No. 62/882,380, filed on Aug. 2, 2019, and which is incorporated herein by reference in its entirety.

BACKGROUND

There are a variety of ways to achieve fault tolerant computing in a server system. As an example, it is possible to connect two (or more) computers, such that one computer, the primary computer (also referred to as machine or node) actively makes calculations or obtains data requested by a client while the secondary computer makes the same calculations as the primary computer to shadow the results of the primary computer. This form of fault tolerant computing, termed active-active fault tolerance, is performed in case the primary computer, or hardware or software component thereon, experiences some type of failure. In these systems, the information about the current state of the primary computer must be periodically saved to the secondary computer so that the primary and secondary computers are substantially synchronized and the secondary computer can substantially take over computation at the point in the calculations where the active primary computer experienced a failure.

The periodic transfer of data to maintain synchrony between the states of the primary and secondary computers is termed checkpointing. A checkpoint defines a point in time when the data is to be transferred from the primary to the secondary computer. A checkpoint controller, which is typically a software module, determines when a checkpoint is declared to occur. During a checkpoint, the processing on the primary computer is at some point paused, so that the final state of the primary machine and associated memory is not changed during the checkpoint interval and once the relevant data is transferred, both the primary and secondary computers are in the same state. When the transfer of information between the primary and secondary computers is complete, the checkpoint is complete, and the execution by the primary and secondary computers is resumed and continues to run the application until the next checkpoint, when the process repeats.

Checkpoints can be determined by the checkpoint controller either to occur by the passage of a fixed amount of elapsed time from the last checkpoint, or by the occurrence of some event, such as: the number pages of memory accessed (termed dirty pages); the occurrence of a network event (such as network acknowledgement output from the primary computer); or the occurrence of excessive buffering on the secondary computer (as compared to available memory) during the execution of the application. Elapsed time checkpointing is considered fixed checkpointing, while event based checkpointing is considered dynamic or variable-rate checkpointing. Data storage systems such as disks and others also can differ as a result of checkpointing processes which can lead to divergence and unwanted error states.

The present disclosure addresses these challenges and others.

FIELD

The invention relates generally to the field of fault tolerant computing and more specifically to checkpointing in a fault tolerant server.

SUMMARY

A checkpoint process copies memory from the primary node to the secondary node. As a result, taking a checkpoint overwrites the secondary node's in-memory caches with the primary node's in-memory caches. Thus, if a checkpoint is taken when cache on the secondary node is not empty, some cached writes on the secondary node would never be flushed to permanent storage. This would cause data corruption on the secondary node.

One way to prevent this problem would be to block taking a checkpoint until flush caches had been completely flushed to disk. This solution would suffer from poor storage performance, and other (non-storage) components could be negatively impacted as well (diverging network packets would be blocked; memory differences would continue to accumulate, increasing the size and duration of the subsequent checkpoint). The methods and systems discussed herein address this technical problem without introducing significant performance degradation.

Specifically, in an active active system, memory contents are synchronized between nodes, disks on the primary and secondary nodes also need to be kept in sync. There's no guarantee that writes generated by the operating system running on the secondary node will be identical to writes generated by the operating system running on the primary node. Therefore, allowing writes to be immediately committed to permanent storage would introduce divergence that would be problematic following the next checkpoint. One way to ensure that disks remain in sync is to cache writes during each run interval. Various systems for implementing caches in system memory on each node/partner system are described. In one embodiment, the checkpointing storage driver constructs two caches for each disk, the "active checkpoint cache", and the "flush cache." In one embodiment, each cache may contain a number of cache entries. Further, each cache entry contains a memory buffer for storing cached data, and a disk sector number, which identifies which sector on the disk is associated with the cache entry. These can be used to manage OS writes and to handle checkpointing data and regulate how it is written to disk on the secondary node.

In part, the disclosure relates to a method of performing a checkpoint process in an active-active computer system including a first node and a second node, wherein each node includes an active checkpoint cache, flush cache, and data storage. The method includes receiving a request for a checkpoint operation at the first node; pausing activity at the first node; notifying the second node of the impending checkpoint operation; performing the checkpoint operation, wherein data associated with the checkpoint operation includes the active checkpoint cache and the flush cache; merging the active checkpoint cache into the flush cache; and resuming activity at the first node.

In one embodiment, the method further includes receiving the notification of the impending checkpoint operation; and pausing activity at the second node. In one embodiment, the method further includes flushing a cache entry from the flush cache to data storage at the first node; clearing a bit associated with the first node and the cache entry, wherein the bit indicates whether the cache entry has been copied to the data storage; constructing a clear dirty bit message associated with the cache entry; and sending the clear dirty bit message to the second node. In one embodiment, the method further includes receiving the clear dirty bit message at the second node; and processing the clear dirty bit message.

In one embodiment, the method further includes associating the clear dirty bit message with one or more cache entries at the second node; determining whether to remove a cache entry based on the one or more cache entries associated with the clear dirty bit message. In one embodiment, the first node is a source computer and wherein the second node is a target computer. In one embodiment, the method further includes flushing to permanent storage on the second node; sending a clear dirty message to the primary node; and removing from cache on the primary node. In one embodiment, the method further includes constructing a first active checkpoint cache in memory of first node; constructing a second active checkpoint cache in memory of second node; constructing a first flush cache in memory of first node; and constructing a second flush cache in memory of second node.

BRIEF DESCRIPTION OF THE DRAWINGS

The structure and function of the invention can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

DETAILED DESCRIPTION

Described herein are systems, methods, and apparatus for optimizing checkpointing operations in an active-active system. Typically, active-active systems include both primary and secondary nodes which are active simultaneously. During checkpoint operations, each operating system on each respective node is paused while memory and other states are copied from the primary node to the secondary node. Over time, during the run interval between checkpoints, divergence (memory, storage, network) occurs; at each subsequent checkpoint, memory and other state are again copied from primary to secondary, bringing the nodes back into sync. After the copy operations associated with a given checkpoint is complete, the operating systems on each node, which had been paused during the checkpoint, begin to execute starting from the same point.

Generally, as memory contents are synchronized between nodes, data storage on the primary and secondary nodes also are kept in sync. Typically, there is not a guarantee that writes generated by the operating system on the primary node will be identical to writes generated by the operating system running on the secondary node, thus immediately committing to permanent storage can introduce data corruption on the secondary node (following the next checkpoint).

In various embodiments, the current disclosure discusses systems, methods, and apparatus's for improving performance and synchronization of each node within an active-active system. An active-active system includes two nodes, each including an operating system, persistent data storage, and network interface hardware. The operating system includes a checkpoint engine, a storage driver, and a hardware interface driver. The storage driver facilitates use of a cache and the data storage. The hardware interface driver facilitates communication between the two nodes using a hardware interface. Various caches may be implemented in protected or generally available computer system memory such as onboard RAM or other addressable memory. As a result, caches are copied with memory as part of checkpointing process.

In various embodiments, checkpointing operations optimize processing reads and writes using two caches and dirty bit tracking. Each node within an active-active system constructs two caches to facilitate committing data from cache to persistent data storage. The first cache is referred to as an "active checkpoint cache" or "active cache" and second cache is called a "flush cache." Each cache can contain a plurality of cache entries; each cache entry contains a sector, a memory buffer, and dirty bits for indicating whether the cache entry was written to permanent storage. The sector corresponds to a sector in persistent storage, the data buffer is used to store the associated data, and the dirty bits indicate whether the local or remote copies of a cache entry need to be committed to persistent data storage. In various embodiments, data storage remains in sync by caching writes during each run, instead of committing each update as it is received.

In various embodiments, during each run interval, writes from the operating system are stored in the active checkpoint cache. Requests to read from data storage are serviced from the cache, falling through to the flush cache and permanent data storage as needed. During a checkpoint operation, both caches are copied from the primary to the secondary node along with other checkpoint data. Upon completion of the checkpoint operation, the contents of the active checkpoint cache are moved and merged into the flush cache. Because storage driver memory is identical between the two nodes, the caches are (at this point) identical between the nodes. As a result, after the checkpoint operation, both caches on each node are identical. In various embodiments, when a run interval begins, writes held in the flush cache are committed to permanent data storage on both nodes, as time permits. New writes are cached in the active checkpoint cache on each respective node. Throughout a run interval, memory managed by each storage driver slowly starts to diverge again. The state of the flush cache depends on when cache flush operations are started and finished. The state of each active checkpoint cache depends on the write requests received from the operating system and where, within their respective active checkpoint cache, each write request is placed.

Since the checkpoint process copies memory from the primary node to the secondary node, taking a checkpoint overwrites the secondary node's flush cache with the primary node's flush cache. Thus, if a checkpoint is taken when the flush cache on the secondary node is not empty, some cached writes on the secondary node could potentially never be flushed to permanent storage. To prevent storage divergence and a prolonged wait for the memory in the flush cache to be committed to permanent data storage, each node within the active-active system uses a combination of node-specific dirty bits and node-to-node messaging to synchronize committing cache entries to data storage. In various embodiments, each node notifies the other node of completed cache entry flushes using "clear cache dirty" messages. Cache entries are removed from the flush cache only after being flushed to permanent storage on both nodes. This ensures that a checkpoint operation does not remove a cache entry from the flush cache prematurely. Therefore, executing a checkpoint operation without waiting for each flush cache to be empty is safe as no information will be lost when the primary node's in-memory flush cache overwrites the secondary node's in-memory flush cache.

In various embodiments, to accommodate storing the additional information, the cache entry data structure is modified to add a set of "dirty bits", one for each node, indicating if that entry needs to be flushed to permanent storage on the respective node. When a node processes a write request from the operating system, entries in the active checkpoint cache are either added or updated. When the entry for each sector comprising the write is added to any cache, both node dirty bits in the entry are set to "true", signifying that neither node has committed the data to persistent data storage. Only when both dirty bits are set to "false" will a cache entry be removed from the flush cache.

In various embodiments, before initiating a checkpoint operation, a node pauses any incoming I/Os and processes any received "clear cache dirty" messages from the partner node in the active-active system. Each "clear cache dirty" message signals to the current node that the partner node has committed cache entries, within the message, to persistent storage. In these embodiments, a storage driver continues to wait until any I/Os currently being processed are completed before the checkpointing operation starts.

In various embodiments, at the conclusion of each checkpoint, the active checkpoint cache entries on each respective node are merged into the flush cache on each respective node. If an entry for a particular sector exists in the active checkpoint cache, but not in the flush cache, then that entry is simply moved into the flush cache. If an entry for a particular sector exists in both caches, the entry from the active checkpoint cache replaces the entry in the flush cache. This merge completes before any "clear cache dirty" messages from the partner are processed or before the active-active system resumes executing (i.e., running the next interval).

When the next run interval begins, entries in the flush cache are committed to permanent storage in the background. In various embodiments, committing means moving data from cache to persistent data storage. In some embodiments, multiple moves/writes can be made simultaneously. Only entries flagged as dirty on a particular node need to be committed to the node's persistent data storage.

Completing a flush write for a cache entry on a node means that the cache entry was written to persistent storage, the local dirty bit was set to "false", and a "clear cache dirty" message was sent to the partner node. The "clear cache dirty" message includes an array of the committed (no longer dirty) cache entries, the size of the array, and the memory address of the associated device data structure (because driver memory is identical between nodes, this memory address can be used to locate the corresponding device structure in memory on the other node).

In various embodiments, when a "clear cache dirty" message is received by a node, the receiving node locates the corresponding local cache entry, and the partner node dirty bit is cleared for that entry. When a cache entry no longer has either dirty bit set, the cache entry is removed from the flush cache as both nodes have committed the data to persistent storage. Commitment of a cache entry could happen first locally or first remotely. Either way, the cache entry is not removed until both nodes have committed the entry. This process and messaging ensures that both active checkpoint caches and flush caches are kept in sync between the two nodes. This allows a checkpoint to be taken without waiting for caches to be fully flushed and without the possibility of failing to flush modified sectors on the secondary node.

Figure 1:
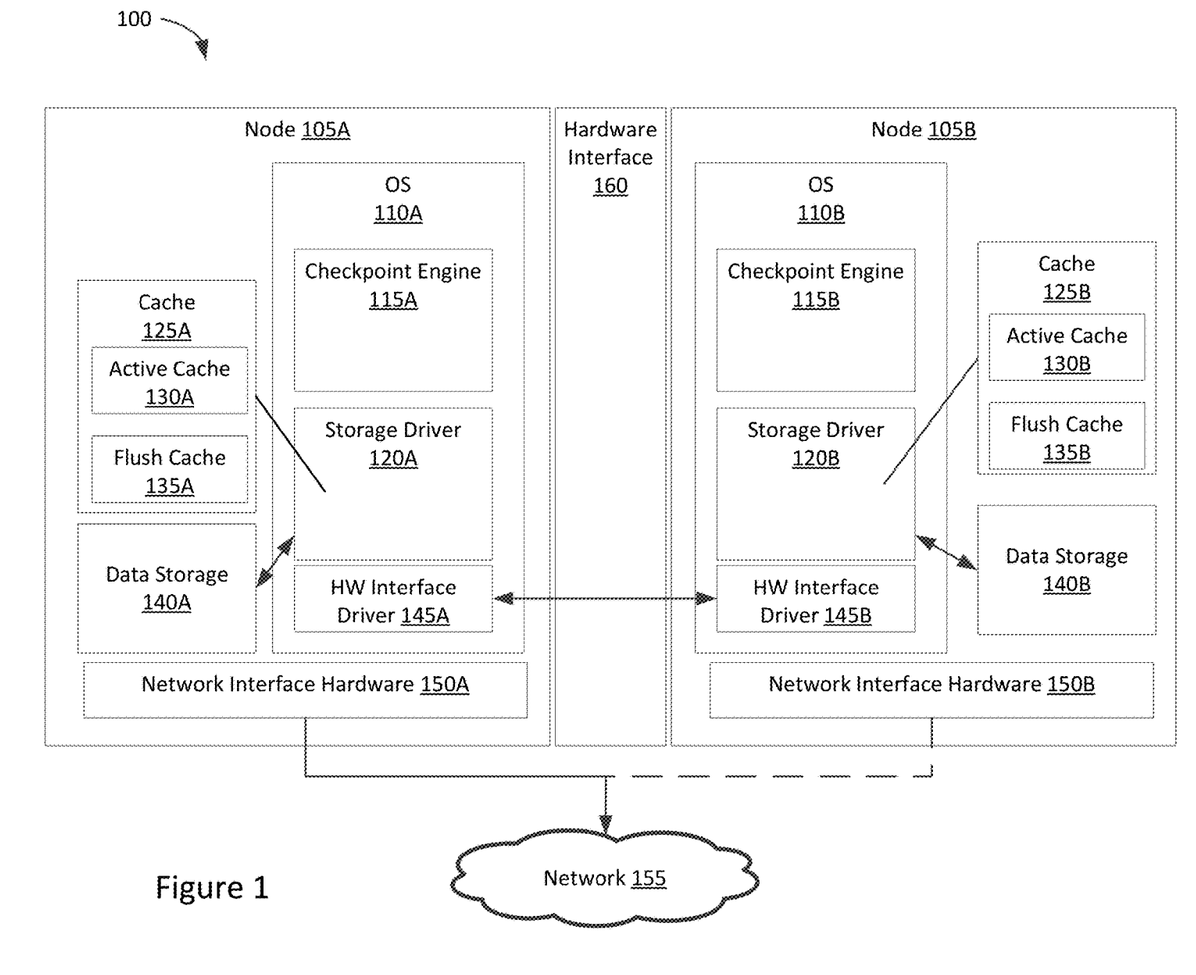
FIG. 1 is a multi-cache system suitable for handling data storage writes and checkpoints in a fault tolerant computing system embodiment of the system of the present disclosure.

FIG. 1 is a diagram of an active-active checkpointing system including a primary and secondary node, in accordance with an embodiment of the present disclosure. The active-active checkpointing system 100 includes node 105A, node 105B, and hardware interface 160. Node 105A includes operating system 110A, Cache 125A, data storage 140A, and network interface hardware 150A. Operating system 110A includes checkpoint engine 115A, storage driver 120A, and Hardware interface driver 145A. Similarly, node 105B includes operating system 110B, cache 125B, data storage 140B, and network interface hardware 150B. Operating system 110B includes checkpoint engine 115B, storage driver 120B, and hardware interface driver 145B.

In this embodiment, OS 110A and OS 110B communicate with cache 125A, Cache 125B and with data storage 140A, 140B through storage drivers 120A, 120B respectively. Node 105A uses HW interface driver 145A to communicate with node 105B using the hardware interface 160. Similarly, node 105B uses hardware interface driver 145B to communicate with Node 105A using the hardware interface 160. Both node 105A and node 105B are capable of communicating with network 155 through network interface hardware 150A and 150B respectively. In this embodiment, the active-active checkpoint system 100 is in a configuration where the connection between the network interface hardware 150B and network 155 is disabled and all communications between node 105A and node 105B are through the hardware interface 160.

As shown, each storage driver 120A, 120B has constructed caches 125A, 125B respectively. Cache 125A is comprised of active checkpoint cache 130A and a flush cache 135A. Cache 125B is comprised of an active checkpoint 130B portion and a flush cache 135B portion. In some embodiments, cache 125A, 125B is not present and each active cache and flush cache are separate, but in electronic communication with each other. In various embodiments, a storage driver can construct each cache from memory, persistent data storage, and/or other storage available within each node. In general, storage/memory that is copied from node to node is suitable for constructing the caches disclosed herein. In various embodiments, the disclosure includes the step of constructing an active cache and a flush cache in memory for both nodes (primary/source, secondary/target) Active checkpoint caches 130A, 130B are used to store writes received by each of the nodes 105A, 105B. After each checkpoint operation, each active checkpoint cache 130A, 130B gets merged into their respective flush cache 135A, 135B and moved to persistent storage. In this case, persistent storage is data storage 140A on node 105A and data storage 140B on node 105B. Reads from each node are serviced based on where the latest data is stored. For example, when servicing a write request on node 105A, the OS 110A looks in the active checkpoint cache 130A first, then the flush cache 135A, then finally the data storage 140A.

Figure 2:
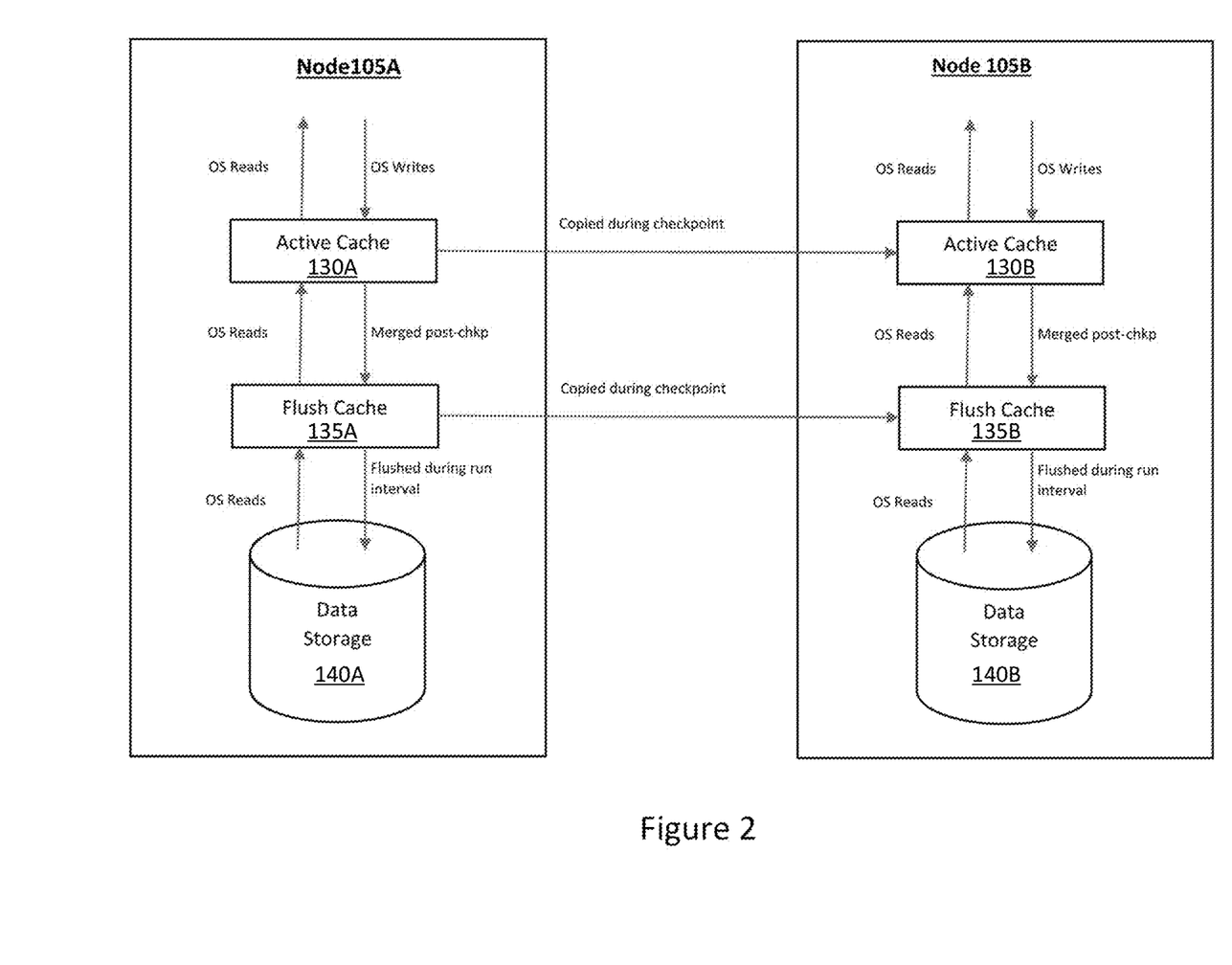
FIG. 2 is a simplified diagram of the active-active checkpointing system shown in FIG. 1, in accordance with an embodiment of the present disclosure.

FIG. 2 is a simplified diagram of the active-active checkpointing system shown in FIG. 1, in accordance with an embodiment of the present disclosure. Active checkpoint cache 130A and active checkpoint cache 130B contain write requests received from clients during the current run (i.e., since the last checkpoint operation). Flush cache 135A and flush cache 135B contain writes from previous runs that have not yet been committed to data storage 140A and data storage 140B respectively. During a checkpoint operation, both the active checkpoint cache 130A and flush cache 135B are copied over to node 105B.

Figure 3:
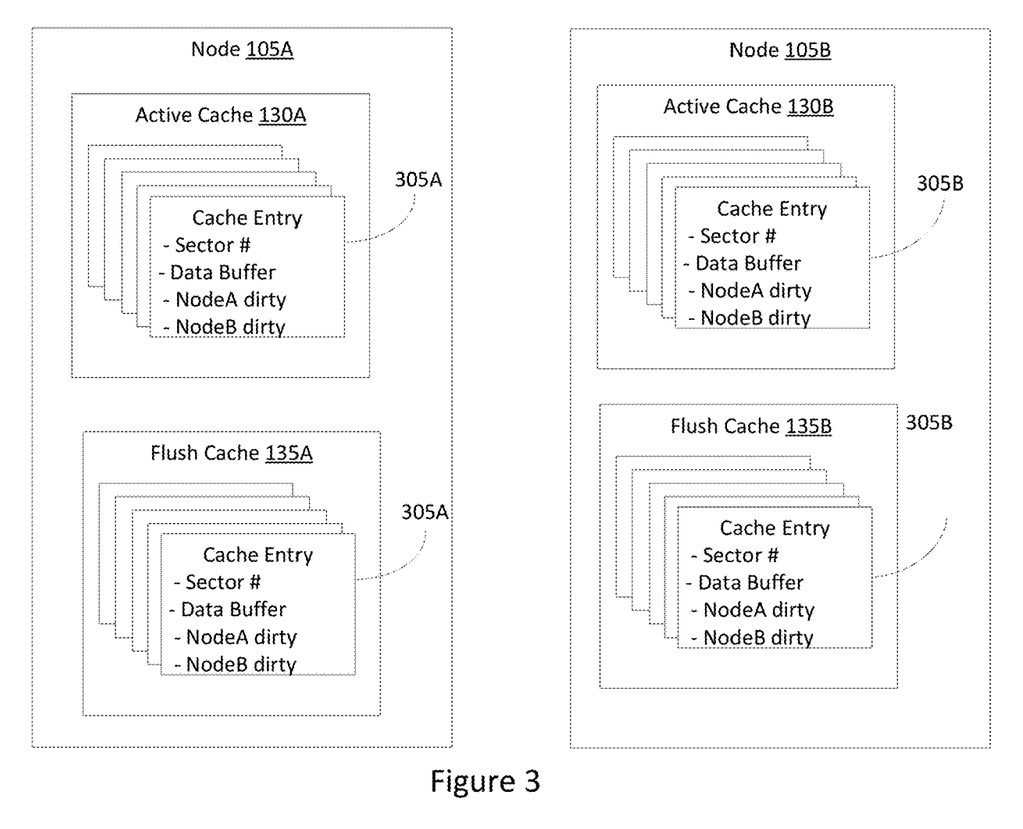
FIG. 3 is a diagram of the cache entries stored within each node of the active-active checkpoint caching system, in accordance with an embodiment of the present disclosure.

FIG. 3 is a diagram of the cache entries stored within each node of the active-active checkpointing system, in accordance with an embodiment of the present disclosure. As shown, Node 105A includes active checkpoint cache 130A and flush cache 135A. Node 105B includes active checkpoint cache 130B and flush cache 135B. Within each of the caches is an example of a cache entry 305A. Each cache entry 305A includes the sector number, a data buffer, and two flags. As shown, in this example, the flags are labeled "NodeA dirty" and "NodeB dirty". "NodeA dirty" signifies that the associated sector on the local machine has changed and the update has not been moved to persistent data storage. "NodeB dirty" signifies that the associated sector on the other machine has changed and the update has not been moved to persistent data storage. NodeA dirty bit is used for Node A, and NodeB dirty bit is used for Node B.

Figure 4:
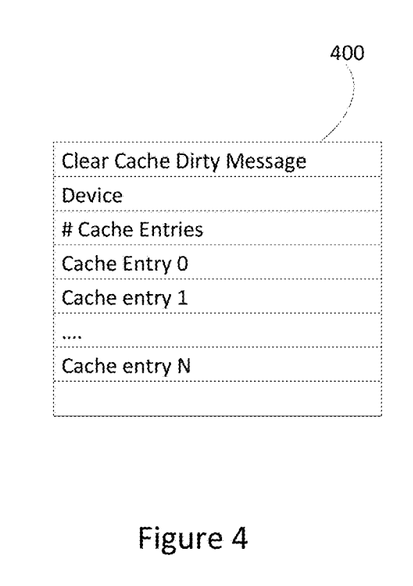
FIG. 4 is a diagram of a clear cache dirty message sent when one or more sectors in cache have been moved to persistent data storage, in accordance with an embodiment of the present disclosure.

FIG. 4 is a diagram of a clear cache dirty message sent when one or more sectors in cache have been moved to persistent data storage, in accordance with an embodiment of the present disclosure. The clear cache dirty message 400 includes an indication of the origination of the message, number of entries included in the message, and a list of each cache entry effected. For example, a message can be from node 105B that includes four entries. The entries that have been moved to persistent storage on node 105B could be entries 0 and 1. In that example, node 105A would set dirty bits associated with entries 0 and 1 to false for Node 105B, which indicates that entries 0 and 1 have already been flushed to persistent storage.

Figure 5:
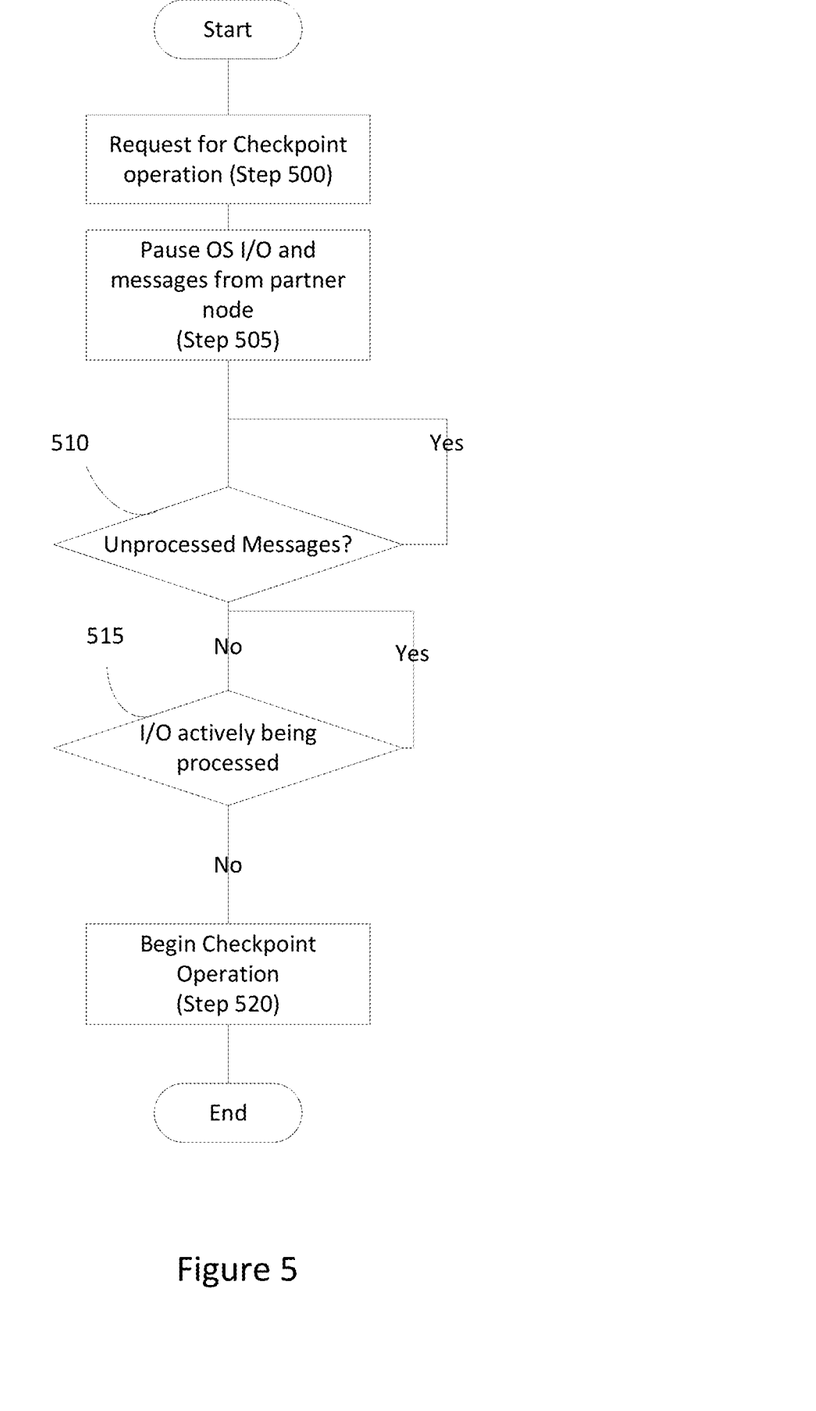
FIG. 5 is a flowchart of a method of initiating a checkpoint operation in the context of storage system, in accordance with an embodiment of the present disclosure.

FIG. 5 is a flowchart of a method of initiating a checkpoint operation, in accordance with an embodiment of the present disclosure. Upon receiving a request to initiate a checkpoint operation (Step 500), checkpoint engine 115A pauses input/outputs (I/Os) from the operating system 110A and pauses messages from node 105B. In various embodiments, I/Os include cache flushes and/or OS reads. If there are any unprocessed clear cache dirty messages from node 105B (Step 510), the storage driver 115A waits until each received clear cache dirty message from node 105B has been processed. If there are any I/Os actively being processed, the storage driver 115A waits until each of those active I/Os (i.e., cache flush, OS read) have completed processing (Step 515). In various embodiments, a storage driver 115A maintains a counter and/or a queue to determine whether any I/Os are currently being processed.

Figure 6:
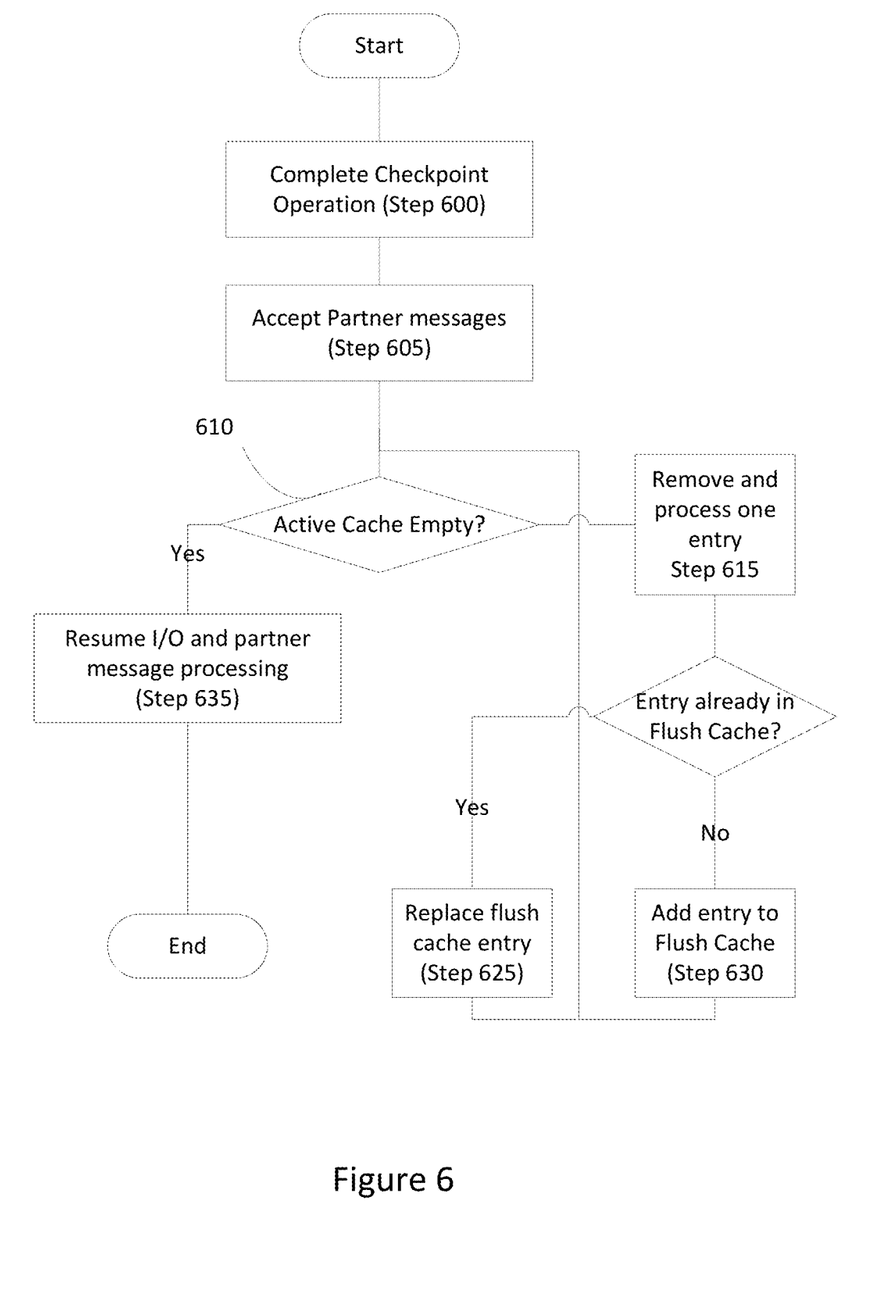
FIG. 6 is a flowchart of a method of managing an active checkpoint cache after completing a checkpoint operation, in accordance of an embodiment of the present disclosure.

FIG. 6 is a flowchart of a method of managing an active checkpoint cache after completing a checkpoint operation, in accordance of an embodiment of the present disclosure. Upon completion of a checkpoint operation (Step 600), the storage driver starts accepting "clear cache dirty" messages from the partner node. If the active checkpoint cache contains entries (Step 610), the current node starts processing each entry until the active checkpoint cache is empty (Step 615). The current node removes each cache entry from the active checkpoint cache as each cache entry is processed. If a cache entry is already in the flush cache, the current node replaces the flush cache entry with the new entry from the active cache (Step 625). If a cache entry from the active checkpoint cache is not in the flush cache, the current node adds the cache entry from the active checkpoint cache to the flush cache (Step 630). Once the active checkpoint cache is empty (Step 610), the current node resumes receiving and processing I/Os (i.e., cache flush, OS reads) and resumes receiving and processing partner messages (Step 635).

Figure 7:
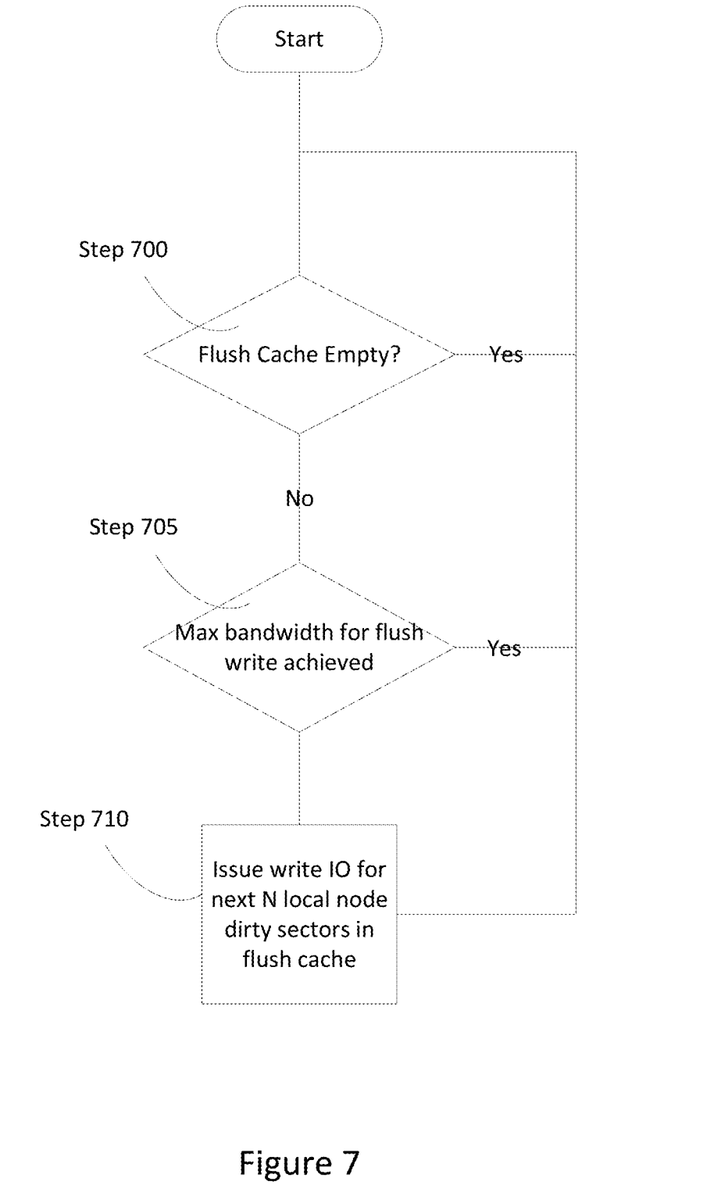
FIG. 7 is a flowchart of a method of flushing cache entries for a flush cache to persistent data storage, in accordance with an embodiment of the present disclosure.

FIG. 7 is a flowchart of a method of flushing cache entries from a flush cache to persistent data storage, in accordance with an embodiment of the present disclosure. Flushing a flush cache to persistent data storage takes place in the background between checkpoint operations. The process of flushing the flush cache continues until the flush cache is empty or until a next checkpoint operation is initiated. Each node processes each entry within the flush cache to move each entry to persistent storage and make space for updated cache entries at the next checkpoint operation. Upon completion of a checkpoint operation and merging of the active checkpoint cache into the flush cache, the storage driver determines whether the flush cache is empty (Step 700).

If the flush cache is not empty (Step 700), the storage driver determines whether the number of flush writes in flight meets or exceeds a maximum number of flush writes allowable by the storage driver (Step 705). If the number of flush writes is less than the maximum number, the storage driver issues a write I/O operation for the next N local node dirty sectors in the flush cache (Step 710). If the storage driver is currently handling the maximum number of flush writes, the storage driver starts again at Step 700 until either the flush cache is empty or less than the maximum number of flush writes are being executed. In various embodiments, the maximum number of flush writes changes depending on desired performance of the active-active system. In some embodiments, if multiple sectors are consecutive, a node flush writes the multiple sectors in a single action. In various embodiments, upon completing a flush write, a node checks to determine whether a checkpoint operation was initiated. If a checkpoint operation was initiated, the node pauses committing the flush cache until after the next checkpoint operation.

Figure 8:
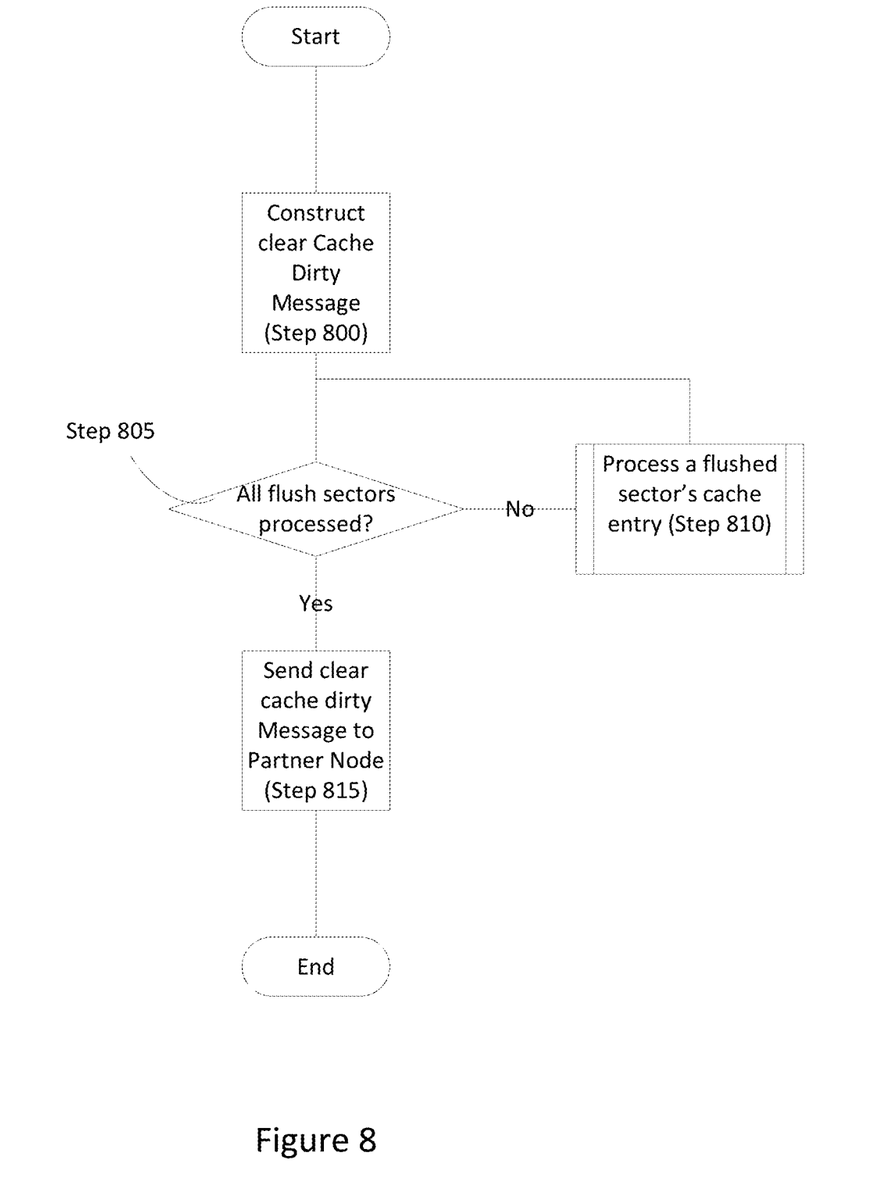
FIG. 8 is a flowchart of a method of constructing a clear dirty cache message in response to flushing one or more cache entries to persistent memory, in accordance with an embodiment of the present disclosure.

FIG. 8 is a flowchart of a method of constructing a clear dirty cache message in response to flushing one or more cache entries to persistent storage, in accordance with an embodiment of the present disclosure. As shown, the storage driver constructs a clear cache dirty message (step 800) after completing a flush write operation and determines whether all flush cache sectors have been processed (Step 805). Upon a determination that entries remain to be processed, the storage driver continues processing each entry (Steph 810) until all flushed entries have been processed. When all flushed entries have been processed, the storage driver completes the clear cache dirty message and sends the clear cache dirty message to the partner node (Step 815). A clear dirty message is issued for each flush operation that completes (which may include multiple flushed cache entries) in various embodiments.

Figure 9:
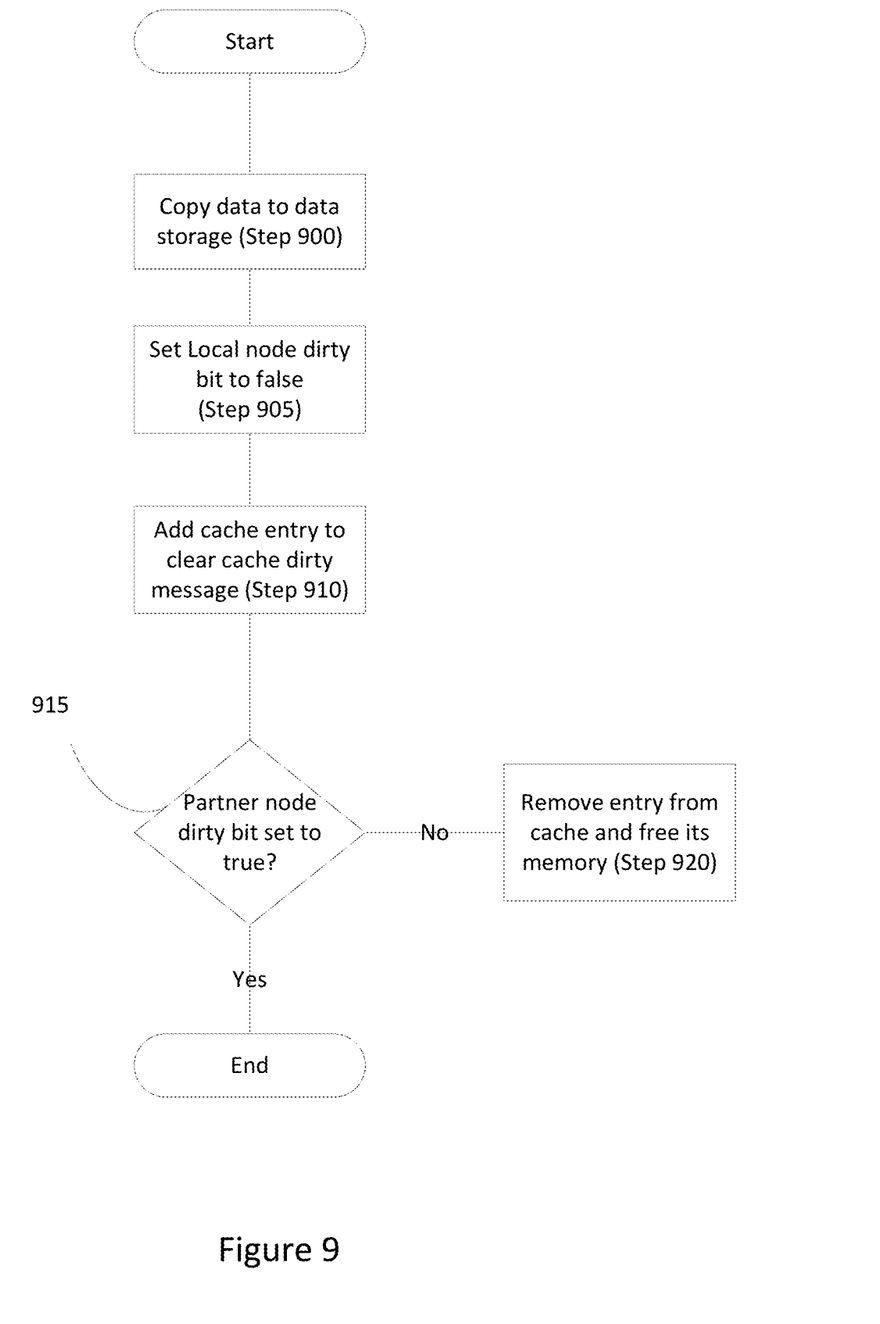
FIG. 9 is a flowchart of a method of processing an entry in the flush cache, in accordance with an embodiment of the present disclosure.

FIG. 9 is a flowchart of a method of processing an entry in the flush cache, in accordance with an embodiment of the present disclosure. Specifically, this figure provides additional details on the "process an entry" step 810 from FIG. 8. The storage driver has moved a selected entry from the flush cache to persistent data storage. The storage driver sets the local node dirty bit for the selected entry from the flush cache to false (Step 905). The storage driver adds the selected cache entry to the "clear cache dirty" message (Step 910) and then determines if the partner node dirty bit is current set to true (Step 915). If the partner node dirty bit is set to true, the storage driver continues to the next flushed cache entry. If the partner node dirty bit is set to false, the storage driver removes the cache entry from the flush cache and frees the memory (Step 920), and then continues on to the next flushed cache entry.

Figure 10:
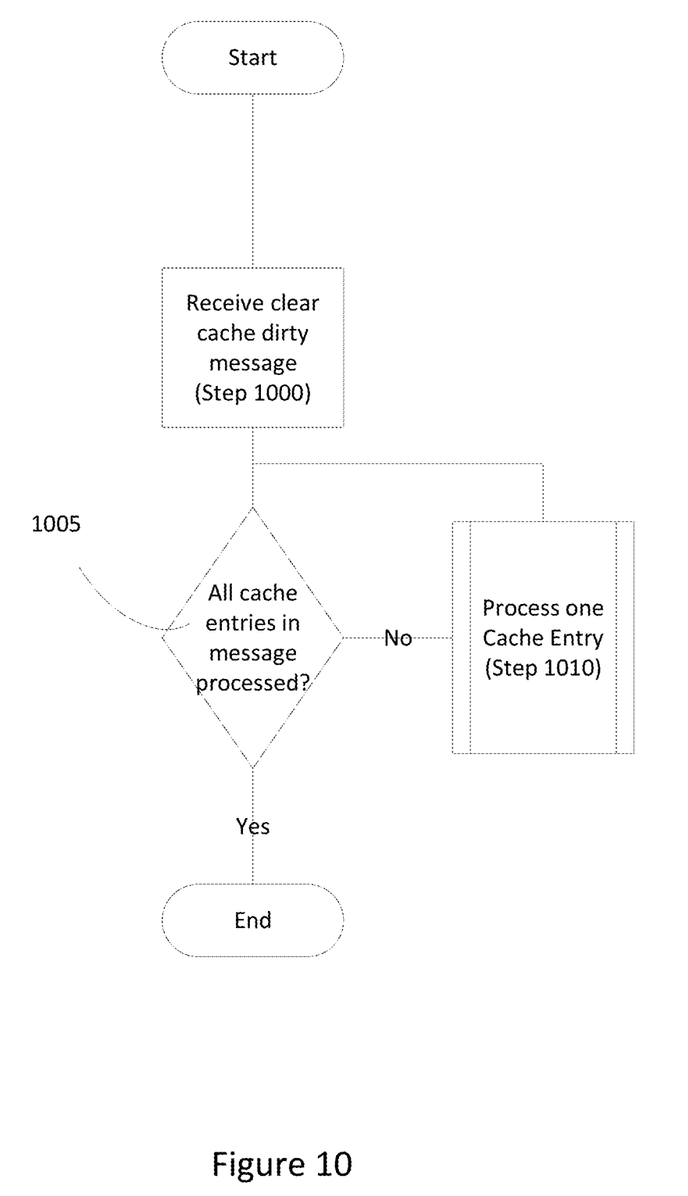
FIG. 10 is a flowchart of a method of processing clear cache dirty messages from a partner computer, in accordance with an embodiment of the present disclosure.

FIG. 10 is a flowchart of a method of processing clear cache dirty messages from a partner computer, in accordance with an embodiment of the present disclosure. When receiving a "clear cache dirty" message (Step 1000), the node determines whether all cache entries referenced in the message have been processed (Step 1005). If all cache entries referenced in the received message have not been processed, the node processes each cache entry referenced in the received message (Step 1010) until each cache entry included in the message has been processed. If all of the cache entries referenced in the clear cache dirty message have been processed the node is done clearing cache dirty message processing (Step 1015) and resumes normal execution.

Figure 11:
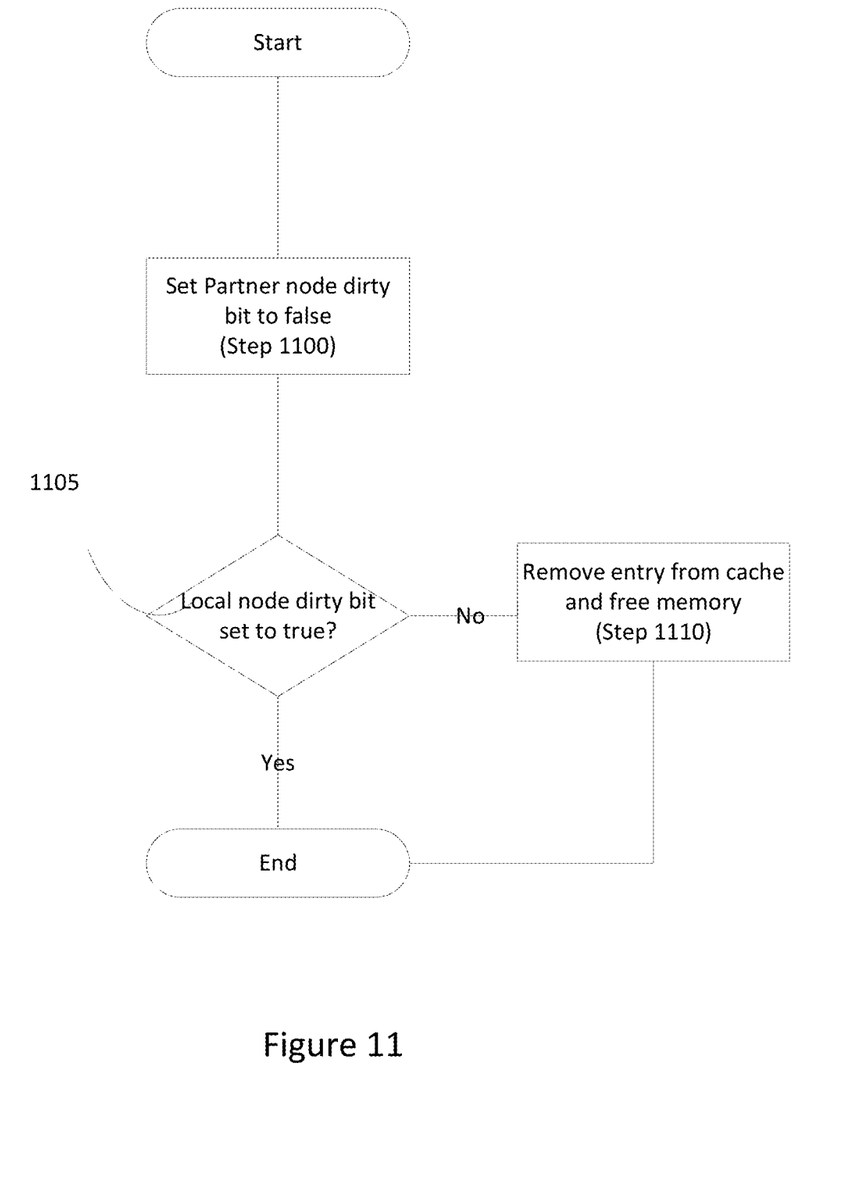
FIG. 11 is a flowchart of a method of processing a cache entry at a computer receiving a clear cache dirty message, in accordance with an embodiment of the present disclosure.

FIG. 11 is a flowchart of a method of processing one cache entry referenced in a clear cache dirty message received at a node, in accordance with an embodiment of the present disclosure. Once a cache entry referenced in the clear cache dirty message is selected, the storage driver sets the partner node dirty bit, associated with the cache entry, to false (Step 1100). If the storage driver determines that the local node dirty bit is set to true (Step 1105), the node continues to maintain the cache entry in the flush cache until the storage driver performs a flush write of the cache entry to persistent storage. If the local node dirty bit is set to false, the node removes the cache entry from the flush cache and frees the memory (Step 1110).

Figure 12:
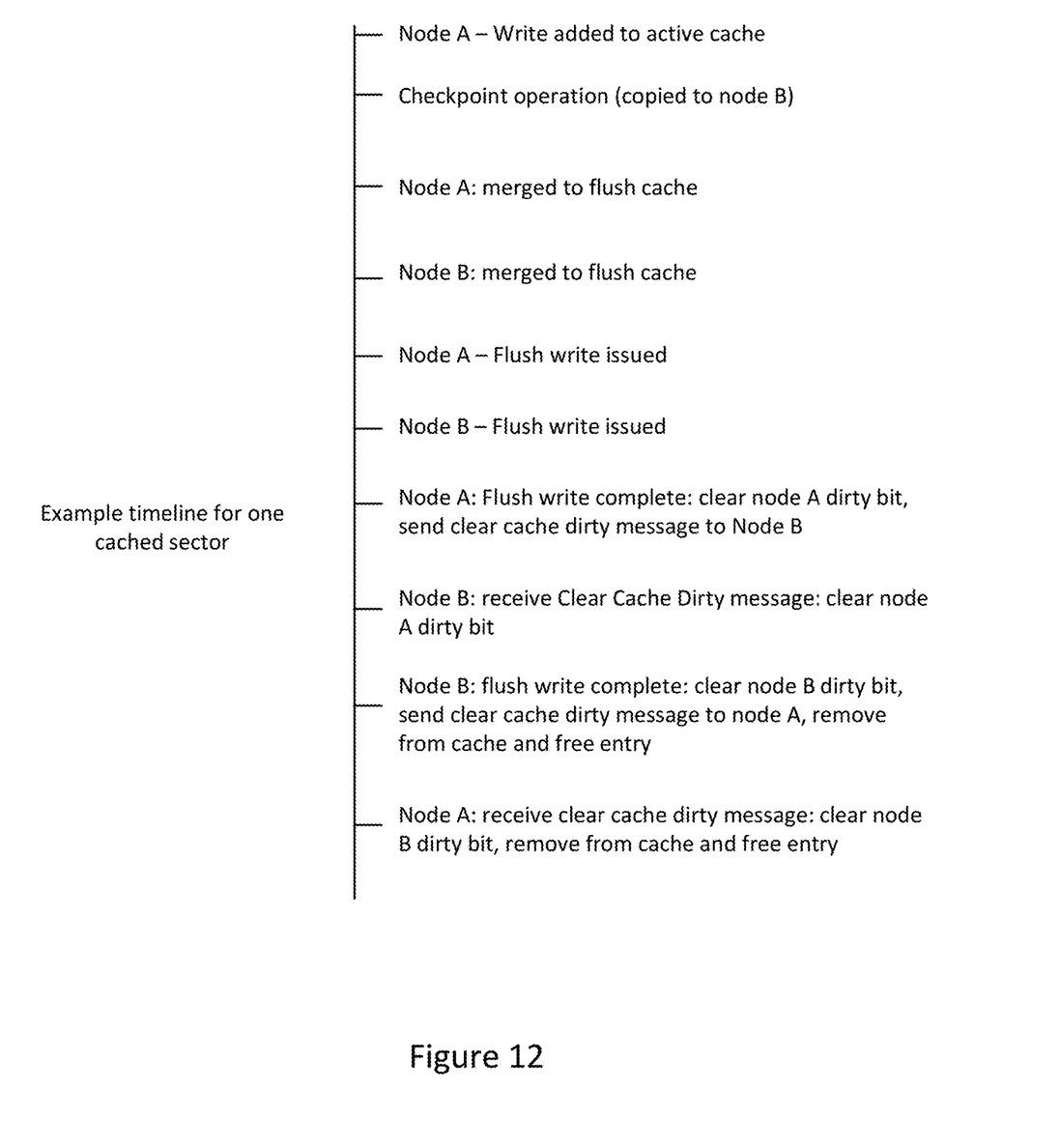
FIG. 12 is an example timeline for one sector cached in the active checkpoint cache, in accordance with an embodiment of the present disclosure.

FIG. 12 is an example timeline for one cached entry in the active checkpoint cache, in accordance with an embodiment of the present disclosure. This example shows the timeline of events for two nodes, node A and node B, when managing one cached entry. First, node A receives a write I/O, which is written to the active checkpoint cache in node A. Next a checkpoint operation has been requested and checkpoint data, which includes the active checkpoint cache and flush cache, are copied from node A to node B. At this point both node A and node B merge their respective active checkpoint caches into their respective flush caches. Following the merging of the active and flush caches, the active-active system resumes execution. In the background, both node A and node B start to move cache entries, and their associated entries, from their respective flush caches to persistent storage.

In one embodiment, node A completes a flush write of a cached entry to persistent storage and clears the node A dirty bit associated with the cached entry. Subsequently, node A sends a "clear cache dirty" message to node B associated with the cached entry. Node B receives the "clear cache dirty" message and clears the local bit associated with the cache entry referenced in the "clear cache dirty" message from node A. Next, node B finishes its own flush write and clears a node B dirty bit associated with the cache entry and sends a "clear cache dirty message" to node A. As node B has already received a "clear cache dirty" message from node A associated with the cache entry, node B also removes the cache entry and frees the memory from the flush cache in node B. When node A receives the clear cache dirty message, node A clears the node B dirty bit and subsequently removes the cache entry and frees the memory associated with the cache entry.

General and Specific Computer-Based Implementations and Embodiments

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the present invention is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. A method of performing a checkpoint process in an active-active computer system including a first node and a second node, wherein each node includes an active checkpoint cache, flush cache, and data storage, the method comprising:
   receiving a request for a checkpoint operation at the first node;
   pausing activity at the first node;
   notifying the second node of the impending checkpoint operation;
   performing the checkpoint operation, wherein data associated with the checkpoint operation includes the active checkpoint cache and the flush cache;
   merging the active checkpoint cache into the flush cache; and
   resuming activity at the first node.

2. The method of claim 1, further comprising:
   receiving the notification of the impending checkpoint operation; and
   pausing activity at the second node.

3. The method of claim 1, further comprising:
   flushing a cache entry from the flush cache to data storage at the first node;
   clearing a bit associated with the first node and the cache entry, wherein the bit indicates whether the cache entry has been copied to the data storage;
   constructing a clear dirty bit message associated with the cache entry; and
   sending the clear dirty bit message to the second node.

4. The method of claim 3, further comprising;
   receiving the clear dirty bit message at the second node; and
   processing the clear dirty bit message.

5. The method of claim 4, further comprising:
   associating the clear dirty bit message with one or more cache entries at the second node; and
   determining whether to remove a cache entry based on the one or more cache entries associated with the clear dirty bit message.

6. The method of claim 1 wherein the first node is a source computer and wherein the second node is a target computer.

7. The method of claim 1 or 5 further comprising:
   flushing to permanent storage on the second node;
   sending a clear dirty message to the primary node; and
   removing from cache on the primary node.

8. The method of claim 1 further comprising
   constructing a first active checkpoint cache in memory of first node;
   constructing a second active checkpoint cache in memory of second node;
   constructing a first flush cache in memory of first node; and
   constructing a second flush cache in memory of second node.

* * * * *